United States Patent [19]
Denham et al.

[11] Patent Number: 4,651,770
[45] Date of Patent: Mar. 24, 1987

[54] CERAMIC DISC FAUCET VALVE

[75] Inventors: Willard A. Denham, Wilmington; Carmen J. Lagarelli, Clayton, both of Del.; Rodolfo J. Viegener, Buenos Aires, Argentina

[73] Assignee: Speakman Company, Wilmington, Del.

[21] Appl. No.: 845,237

[22] Filed: Mar. 28, 1986

[51] Int. Cl.$^4$ .............................................. F16K 25/00
[52] U.S. Cl. ................... 137/270; 137/494.5; 137/625.31
[58] Field of Search .................. 137/270, 454.2, 454.5, 137/625.31

[56] References Cited

U.S. PATENT DOCUMENTS

| | | | |
|---|---|---|---|
| 2,935,293 | 5/1960 | Monson | 137/625.31 X |
| 2,994,343 | 8/1961 | Banks | 137/454.5 |
| 3,144,878 | 8/1964 | Williams | 137/625.31 |
| 4,397,330 | 8/1983 | Hayman | 137/270 |

Primary Examiner—Harold W. Weakley
Attorney, Agent, or Firm—Connolly & Hutz

[57] ABSTRACT

A faucet valve of the ceramic disc type convertable from hot to cold water usage by a reassembling of the elements.

9 Claims, 12 Drawing Figures

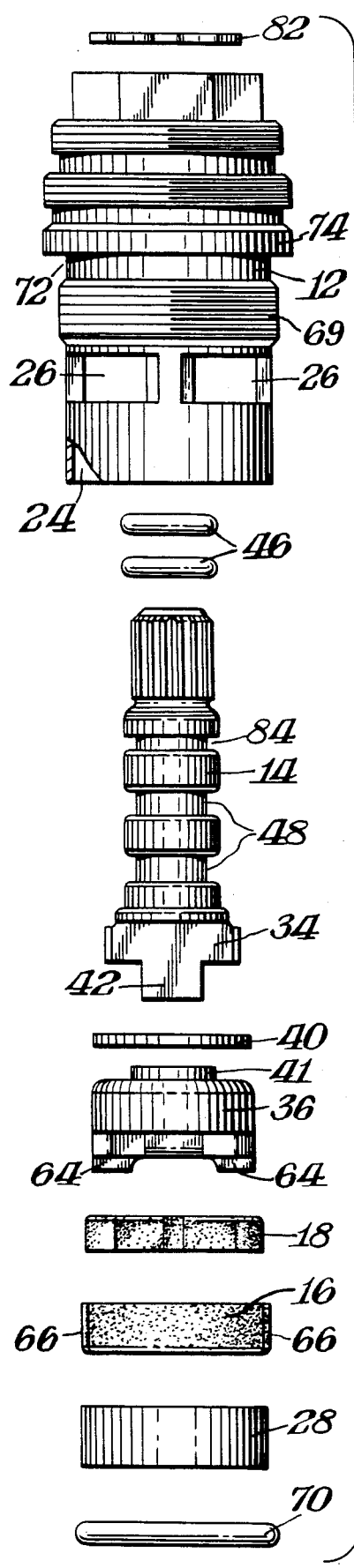
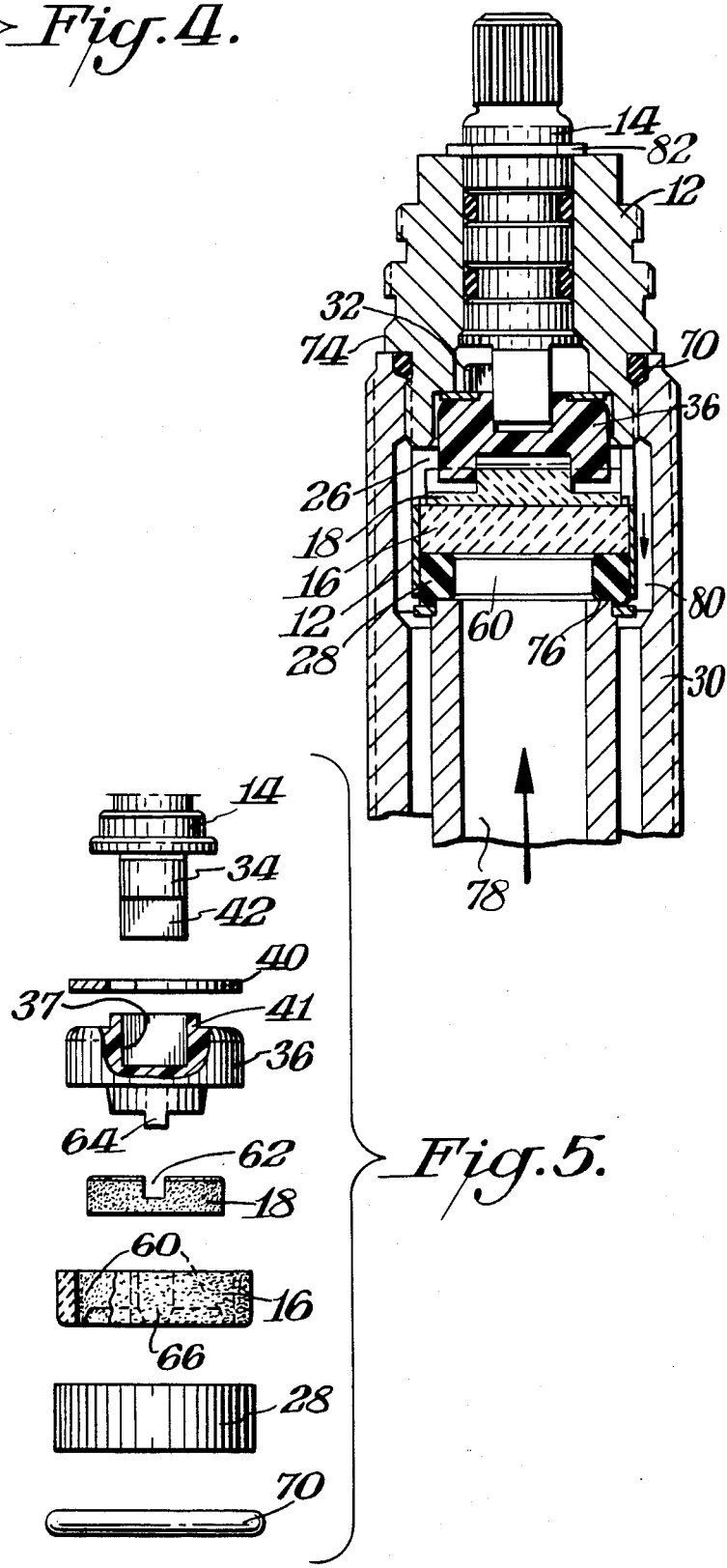

CERAMIC DISC FAUCET VALVE

BACKGROUND OF THE INVENTION

One form of faucet valve commonly used today is the so called "drop-in" valve which operates to control flow therethrough typically by a 90° or greater rotation of the valve control handle. This type of valve is often referred to as the non-rising type because control of flow is accomplished without vertical movement of the handle.

Typically separate non-rising valves are provided for the hot and cold water supply. The outlet form each valve is connected to a common discharge of the hot and cold water metered through the valves.

Valve assemblies of this type described in the past have utilized long wearing ceramic material that has been lapped and honed to provide extremely flat valving surfaces that can slide against one another to selectively seal liquid under pressure. Examples of such valves, as illustrated in the prior art, are those disclosed in U.S. Pat. Nos. 3,207,181; 3,645,493; 3,780,758; 3,807,455; 3,810,602; 3,831,621; 3,834,416; 4,005,728; 4,250,912; 4,331,176 and 4,453,567.

Typically the valves illustrated in these patents contain a pair of ceramic valve elements with porting in one or both elements. Flow through the porting in the elements is controlled by 90° or greater rotation of one ceramic element relative to another fixed element.

A problem common to most valves of this type is provision of means for converting the valve from clockwise (e.g., cold water) operation to counterclockwise (e.g., hot water) operation. To simplify inventory and installation it is desirable to have a single valve which can be used to control cold and hot water inlets with minimum modification to accommodate clockwise and counterclockwise operation, respectively, by the user. The prior art has approached this problem from several directions none of which has the simplicity or advantages of this invention. In U.S. Pat. No. 3,780,758 (columns 5 and 6) this problem is addressed by providing different valve stems, one for clockwise and the other for counterclockwise operation. This is an expensive solution to the problem and one fraught with problems of loose extra parts that can be lost or installed backwards.

Another approach to the problem is disclosed in U.S. Pat. No. 3,807,455 in which a complicated procedure is described for aligning one of the ceramic valve discs within the valve body at the time the valve is assembled. No provision is made for adaptation of the valve for clockwise and counterclockwise movement at the time of installation as provided for in the instant invention. Other approaches to the problem are disclosed in U.S. Pat. Nos. 3,831,621 (see column 6) and 4,005,728 (see column 5).

The prior art recognizes the need for means to bias the ceramic valve elements together to prevent separation of same when subjected to internal hydraulic pressures. Biasing means used in the prior art include springs (for example as shown in U.S. Pat. Nos. 3,645,189; 3,645,493 and 3,807,455) as well as O-rings and O-ring retainers sandwiched between the valve elements and the valve cartridge body (U.S. Pat. Nos. 3,831,621; 3,810,602; 4,331,176; 4,453,567). The instant invention discloses a novel sealing configuration which biases the ceramic elements together and seals off a leakage path between the periphery of the ceramic elements and the surrounding valve body with a novel compressible sealing means.

Typically, leakage along the valve stem or spindle is prevented by one or more O-rings between the spindle and mating bore in the valve body through which the spindle passes (see U.S. Pat. No. 3,207,181; 3,645,289; 3,780,758; 4,005,728). Over a period of usage these O-rings dry up thereby inviting leakage and/or difficulty in rotating the stem. The current invention overcomes these problems with novel means for maintaining the lubricity of the O-ring seals used in this invention.

SUMMARY OF THE INVENTION

The present valve is of the replaceable type, that is, all of the operating parts are fully protected and contained within an operating cartridge which can be readily inserted and removed from a faucet housing. The faucet housing contains waterways which supply either hot or cold water to the cartridge and channel water away from the cartridge to a spout or other outlet.

The valve of this invention is designed to be compact and inexpensive, but tough. Even after 2,000,000 operating cycles it was found to still be in excellent operating condition without leakage. This represents over 50 years of actual use.

Many features of the valve contribute to the remarkable performance. One such feature is the use of low mass valving members formed from ceramic or like hard material which are honed, lapped and polished to provide frictionless and leakfree valving. The ceramic valve elements include a pair of hard mating ceramic members one of which is stationary (stator) while the other member (rotor) is rotatably controlled by a rotating spindle. The spindle does not move axially relative to the valve body and is thus referred to as a "non-rising" spindle or stem. Simple 90° rotation of the spindle permits full operation of the valve from full flow to shut off.

The upper movable ceramic disc (rotor) is of a unique low mass design that controls flow through the cartridge with a minimum of waterways or passages therein. The absence of waterways within the upper disc also reduces the mass of this part permitting easier operation and less wear on the disc. Moreover, since there is no enclosed surface within this disc on which water can exert upward pressure during operation there is little or no force acting to separate the ceramic elements in operation as is the case with many prior art ceramic discs.

Other features contributing to the extraordinary long life of this valve are the unique use of dual O-ring seals on the spindle with a lubricant injected between the O-rings during manufacture to provide a reservoir of lubrication for the seals. Keyed into the spindle is a drive disc which transmits rotational movement from the spindle to the upper ceramic disc (rotor).

This drive disc and coacting washer act as a clutch between the spindle and upper ceramic disc. They absorb the impact from abrupt movement and stoppage of the spindle and also absorb loads exerted by thermal expansion and contraction of the valve parts. Operational limits on rotation of the spindle are achieved by coaction between lugs on the spindle and stops incorporated in the valve body.

As noted above, an important feature of this invention as its simple conversion from clockwise to counterclockwise operation for use as a cold and hot water valve, respectively. This is achieved by simple reorientation of the lower ceramic disc element (stator) about 90° within the valve body. The lower disc has built in lugs which fit into appropriately placed slots within the valve body to permit the reorientation needed to change the valve from hot to cold water operation. The bottom of the valve cartridge is sealed within the faucet housing by a single seat washer of generally rectangular cross-section. This washer not only acts as a seal but also as a biasing means for maintaining sealing contact between the ceramic valve elements.

BRIEF DESCRIPTION OF THE DRAWINGS

FIG. 4 is an exploded front view of the structure of the components to be included within the valve cartridge;

FIG. 5 is a partial exploded side view of some of the components included within the valve cartridge;

FIG. 12 is a cross-sectional elevational view of the valve cartridge of this invention placed within a faucet housing.

DESCRIPTION OF PREFERRED EMBODIMENT

Figure 2:
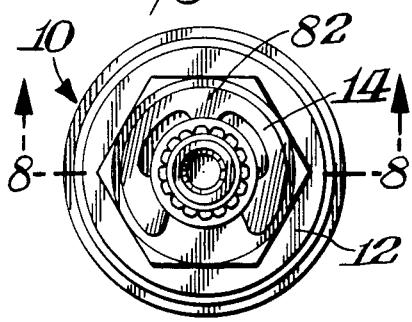
FIG. 2 is a top plan view of the assembly of the valve cartridge.

While the present invention will be described in connection with a preferred embodiment it is not intended to be limited to such specific embodiment. On the contrary it is intended that all alternatives, modifications, and equivalents be included within the spirit of the scope of the present invention as expressed in the appended claims.

Turning now to the drawings and specifically FIGS. 1 through 5, a valve cartridge 10 embodying the present invention is illustrated. The valve cartridge 10 includes a generally cylindrical valve body or housing 12, a spindle 14 to which a handle (not shown) may be attached, and stationary and movable ceramic disc elements 16 and 18, respectively.

The valve housing 12 is preferably made out of metal, of alternatively, plastics capable of withstanding the temperatures and pressures involved. Housing 12 is generally cylindrical in shape including a bore 20 for receiving the spindle 14 and coaxial counter bore or chamber 22 in the lower portion of the valve body 12 to accommodate the ceramic disc elements 16 and 18 and related parts necessary to functioning of those ceramic discs, as explained later. The lower end of valve body 12 is essentially open to form an inlet port 24 through which water or other fluid flows into and through valve cartridge 10. The water passes through ceramic discs 16 and 18 and out of the cartridge through outlet ports 26 formed in the side of the valve body adjacent chamber 22.

Figure 8:
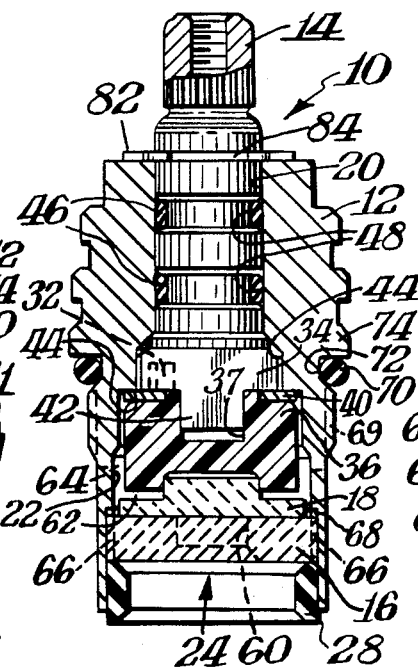
FIG. 8 is a cross-sectional elevational view taken along lines 8—8 of FIG. 2.

Located within inlet port 24 is a unique seat washer 28 of generally rectangular cross section, as shown in FIGS. 4 and 8. This washer 28 acts as a sealing means between the valve body 12 and faucet housing 30. As shown in FIG. 12, valve body 12 is constructed such that the washer 28 is placed under compression when the valve body 12 is secured within faucet housing 30. This compressive force acts on the lower ceramic disc 16 to maintain it in sealing contact with the upper ceramic disc 18. Seat washer 28 also acts to seal off leakage around the lower ceramic disc 16 when flow through the cartridge is shut off. The rectangular configuration of the washer 28 provides sealing contact with the interior walls of valve body 12 as well as the underside of lower ceramic disc 16 thereby preventing unwanted fluid flow around the periphery of ceramic disc 16.

Figure 11:
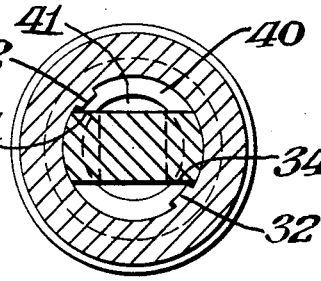
FIG. 11 is a cross-sectional plan view illustrating internal stops in the valve body and taken along lines 11—11 of FIG. 1.

Within valve body 12 there are located rotational limit stops 32 which coact with transverse tab 34 at the bottom of spindle 14 to limit rotation of the spindle to about 90° as shown in FIGS. 8 and 11. Thus, all force exerted by a user of the faucet 30 in opening and closing the valve is transmitted directly from spindle 14 to valve body 12 rather than to the ceramic discs 16 and 18. The valve body 12 and spindle 14 are made of materials, preferably metal, which are more suitable for absorbing the shock of operation than the ceramic material in discs 16 and 18. Such shock is especially severe if an elongated handle is attached to spindle 14 to open and close the valve cartridge 10.

Further isolating the ceramic discs 16 and 18 from the impact and stresses of operation is drive disc 36 which dampens the forces exerted on the spindle 14 by persons using the valve cartridge 10. Drive disc 36 also helps to isolate and dampen thermal stresses within the valve cartridge. Drive disc 36 is preferably formed from a plastic material such as nylon, CELCON, and acetal copolymer made by Celanese, or similar materials. Metal washer 40 fits around boss 41 on the upper surface of drive disc 36 as shown in FIG. 4. Tab 42 on spindle 14 fits into a mating recess 37 (FIG. 5) in disc 36 so that rotation of the spindle is transferred to disc 36. Washer 40 provides a rigid surface against which the drive disc 36 and limit tab 34 bears. This also maintains careful alignment of the drive disc and the upper ceramic seat 18 into which it is keyed. Washer 40 also provides a smooth bearing surface between the drive disc 36 and the underside of the shoulder 44 in the valve body 12.

The spindle 14 is sealed within valve body 12 by use of dual O-rings 46 which are placed in grooves 48 in spindle 14. Prior to assembling spindle 14 with O-rings 46 into bore 20 of valve body 12 a suitable long lasting lubricant is placed on and between the O-rings 46. Once inserted into bore 20, spindle 14 with lubricant in place provides a permanently lubricated seal to prevent leakage between spindle 14 and the valve body 12. Because of the lubrication the rotational effort needed to operate the valve cartridge 10 is substantially reduced and the life of the O-rings is substantially extended. This feature, in conjunction with the ceramic valve components described herein, enabled this valve to operate over 2,000,000 cycles without failure or leakage.

Figure 6:
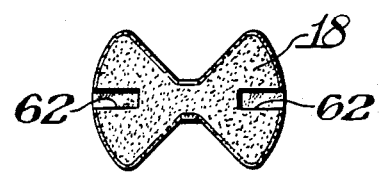
FIG. 6 is a top plan view of the upper ceramic disc.
Figure 1:
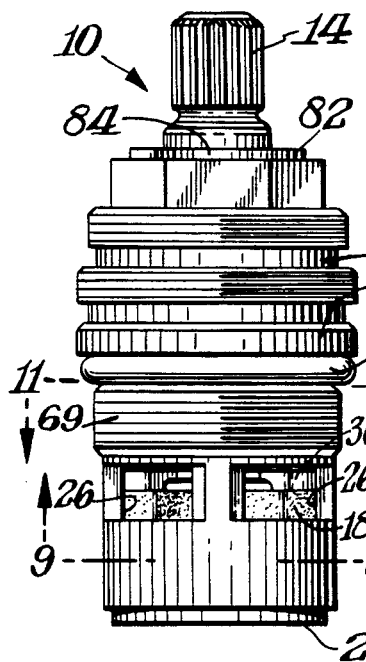
FIG. 1 is a side elevational view showing the entire assembly of the valve cartridge in accordance with a preferred embodiment of the invention.
Figure 7:
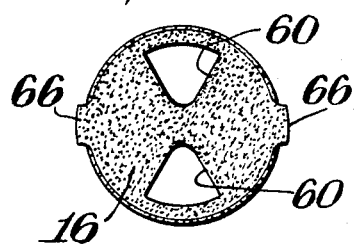
FIG. 7 is a top plan view of the lower ceramic disc.
Figure 9:
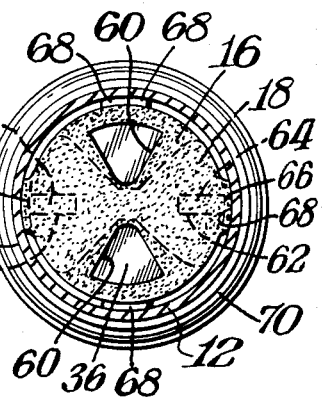
FIG. 9 is a cross-sectional plan view through lines 9—9 of FIG. 1.
Figure 3:
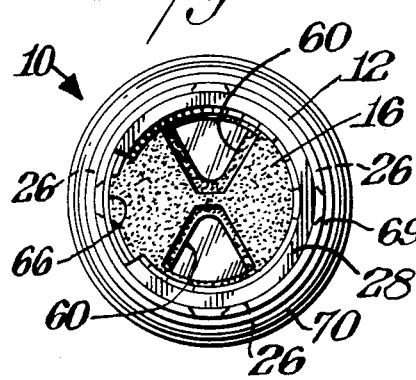
FIG. 3 is a bottom plan view of the valve cartridge.
Figure 10:
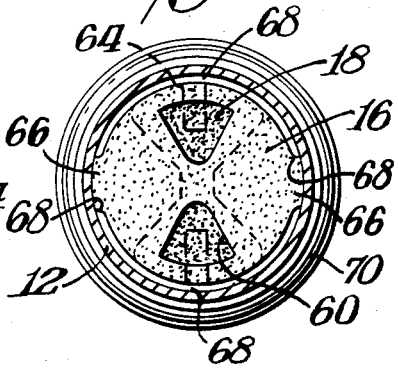
FIG. 10 is a cross-sectional plan view taken along lines 9—9 of FIG. 1 with the lower ceramic disc rotated 90° from the position illustrated in FIG. 9.

As illustrated in FIG. 7 the lower ceramic disc 16 is generally circular in configuration having two generally triangular ports 60 located in opposite quadrants. The upper ceramic disc 18 has an hour glass configuration (see FIG. 6) and has recesses 62 in its upper surface to receive extensions 64 of drive disc 36. 90° rotation of spindle 14 in turn rotates upper ceramic disc 18 a like amount opening ports 60 in lower ceramic disc 16 to enable flow to commence as shown in FIG. 9. Similarly, rotation in the opposite direction will shut off flow through openings 60 in lower ceramic disc 16 as shown in FIG. 10.

As noted above, in accordance with this invention it is possible to use valve cartridge 10 to control both hot and cold water flow with no substantial changes or addition to the cartridge. All that is needed to change the valve from clockwise to counterclockwise operation is to rotate lower ceramic disc 16 by 90° within valve body 12. To facilitate that rotation the lower ceramic disc 16 is provided with lugs 66 formed in the periphery of that disc as shown in FIG. 7. These lugs 66 mate with corresponding slots 68 on the interior wall of valve body 12. Slots 68 are preferably arranged 90° from each other around the inner periphery of the inner wall of valve body 12 such that the lower ceramic disc may be rotated 90° in either direction to provide clockwise and counterclockwise control of flow through the cartridge 10. To change the valve cartridge 10 from clockwise to counterclockwise operation or vice versa it is necessary only to remove seat washer 28 from the bottom of valve body 12, slide lower ceramic disc 16 out of the valve body and rotate it 90° relative to valve body 10 and replace it and washer 28 in valve body 12.

In operation the valve cartridge 10 is inserted in a faucet 30. Threads 69 on the outer periphery of valve body 12 coact with mating threads on faucet housing 30 to pull valve body into place (FIG. 12). Interposed between valve body 12 and faucet housing 30 is O-ring 70 arranged in groove 72 of valve body 12. This O-ring 70 prevents leakage between faucet housing 30 and valve body 12. The distance between shoulder 74 on valve body 12 and the bottom of valve body 12 is designed so that there is a slight compression of the seat washer 28 when valve body 12 is secured in faucet housing 30. This seat washer 28 seals the opening between the upper end 76 of faucet housing 30 in addition to the other functions previously described.

Once properly seated within faucet housing 30 the valve cartridge 10 is ready to operate. In operation water flows from water inlet 78 of faucet housing 30 through opening 60 in lower ceramic disc 16 and from there flows through outlet ports 26 in valve body 12 into an annular outlet passage 80 in housing 30. To regulate flow of water through cartridge 10 it is necessary only to slightly rotate spindle 14 in either clockwise or counterclockwise direction so that the ears of upper ceramic disc 18 start to slide across opening 60 in lower ceramic disc 16. Flow can thus be modulated from full open to full off by simple 90° rotation of the spindle.

As illustrated in FIG. 6 the ceramic disc 18 has very little mass. It has no interior surfaces which would tend to force this disc away from its mating lower disc 16. Once the valve 10 is opened the water pressure on both sides of upper ceramic disc 18 are essentially balanced thereby further contributing to ease of operation and control of flow.

When upper ceramic disc 18 is in a closed position, openings 60 of the lower ceramic disc 16 are fully covered by the upper disc 18 as shown in FIG. 10. Pressure exerted through inlet 78 will tend to force the upper ceramic disc 16 and thereby precipitate leakage. This tendency, however, is overcome by the squeezing pressure exerted by seat washer 28 which biases the lower ceramic disc 16 into continuous sealing contact with upper ceramic disc 18. The upper disc 18 is maintained in positive contact with lower disc 16 by drive disc 36 and washer 40. Upward pressure on disc 36 is resisted by abutment of washer 40 on shoulder 44.

Retaining clip 82 is placed in a groove 84 of spindle 14. This clip bears on the upper surface of valve body 12 when downward pressure is exerted on the spindle by a user thereby preventing downward movement of the spindle against the ceramic valve elements 16 and 18 and other internal operating parts. This arrangement further enhances the longevity of the valve since it prevents undue pressure from being exerted on working parts in the valve cartridge 10.

What is claimed is:

1. A replaceable cartridge type valve for use in a faucet housing comprising
    an axially bored valve body with an open lower end in fluid communication with a supply of hot or cold fluid, said valve controlling the rate of fluid flow from the supply, at least one outlet in said valve bodyy in fluid communication with an outlet in said faucet housing,
    stationary and movable ceramic valve elements arranged in said housing for regulating fluid flow through the valve by rotation of the movable ceramic element,
    a rotatable spindle sealed within an axial bore of the upper part of said valve body,
    a drive disc arranged between the lower end of said spindle and the movable ceramic disc and flexibly keyed to each for transmitting movement of the spindle to the upper ceramic disc while absorbing and adjusting for dynamic and thermal shock, and
    means for sealing the spindle within the valve body comprising at least two O-rings arranged on the spindle spaced apart from each other and lubricants for O-rings retained between O-rings when placed in the valve body.

2. The valve cartridge of claim 1 wherein the movable ceramic element is of low mass having an hourglass shape.

3. The valve cartridge of claim 1 wherein the stationary lower ceramic disc is generally circular having two triangular ports therein.

4. The valve cartridge of claim 1 wherein the stationary lower ceramic disc is circular and contains at least one lug arranged on its periphery for engagement with corresponding recesses on the inner periphery of the bore in the lower portion of the valve body, the recesses in the valve body being offset from each other by about 90° to thereby enable 90° rotation of the lower ceramic disc to a new fixed position to facilitate control of water flow through the valve by clockwise or counterclockwise rotation of the spindle.

5. The valve cartridge of claim 1 wherein a washer of generally rectangular cross section is placed in the lower open end of the valve body below the lower ceramic disc to seal the valve body to the faucet housing and prevent leakage between the lower ceramic disc and interior of the valve body.

6. The valve cartridge of claim 5 wherein the cross section of the washer is of greater dimension along the axial direction of the valve body than in a direction transverse to the axis of the valve body.

7. The valve cartridge of claim 5 wherein the washer is compressed in the axial direction when the cartridge is placed in the faucet housing.

8. The valve cartridge of claim 1 wherein a thin metallic washer is placed between the upper surface of the drive disc and an inner shoulder of the valve body to facilitate rotational movement of the drive disc relative to the valve body.

9. The valve cartridge of claim 1 wherein a removable retaining clip is arranged in a groove in that part of the spindle extending beyond the top of the valve body, said clip limiting downward vertical movement of the spindle within the valve body.

* * * * *